United States Patent [19]

Vairo et al.

[11] Patent Number: 5,020,739
[45] Date of Patent: Jun. 4, 1991

[54] SELECTABLE TOWLINE SPIN CHUTE SYSTEM

[75] Inventors: Daniel M. Vairo; Raymond D. Whipple, both of Newport News, Va.

[73] Assignee: The United States of America as represented by the Administrator of the National Aeronautics and Space Administration, Washington, D.C.

[21] Appl. No.: 603,335

[22] Filed: Oct. 25, 1990

[51] Int. Cl.⁵ .............................................. B64C 17/00
[52] U.S. Cl. .................................. 244/75 R; 244/113; 244/139
[58] Field of Search ............ 244/139, 140, 141, 75 R, 244/138 R, 113

[56] References Cited

U.S. PATENT DOCUMENTS

| Re. 27,162 | 8/1971 | Markham et al. | 244/139 |
|---|---|---|---|
| 1,556,502 | 10/1925 | Doucett . | |
| 1,900,399 | 3/1933 | Lakehurst . | |
| 1,970,812 | 8/1934 | Myers | 244/139 |
| 3,112,906 | 12/1963 | Zeyher | 244/138 R |
| 3,409,254 | 11/1968 | Nastase | 244/138 R |
| 3,463,425 | 8/1969 | Hibi | 244/139 |
| 3,721,408 | 3/1973 | Drew | 244/139 |
| 4,040,583 | 8/1977 | Bihrle, Jr. | 244/113 |
| 4,356,984 | 11/1982 | Worth et al. | 244/139 X |
| 4,496,122 | 1/1985 | Whipple | 244/75 R |
| 4,538,778 | 9/1985 | White | 244/75 R |

*Primary Examiner*—Joseph F. Peters, Jr.
*Assistant Examiner*—Carla Mattix
*Attorney, Agent, or Firm*—George F. Helfrich

[57] ABSTRACT

An emergency spin recovery parachute is housed within a centrally mounted housing on the aft end of an aircraft and is connected to a ring fitting within the housing. Two selectively latching shackles, connected to separate towlines are openly disposed adjacent the ring fitting. The towlines extend in opposite directions from the housing along the aircraft wing to attachment points adjacent the wing-tips, where the other end of each towline is secured. Upon pilot command, one of the open shackles latches to the ring fitting to attach the towline connected thereto, and a second command signal deploys the parachute. Suitable break-away straps secure the towlines to the aircraft surface until the parachute is deployed and the resulting force on the towline attached to the parachute overcomes the straps and permits the towline to extend to the point of attachment to exert sufficient drag on the spinning aircraft to permit the pilot to regain control of the aircraft. To employ the parachute as a drag chute to reduce landing speeds, both shackles and their respective towlines are latched to the ring fitting.

14 Claims, 4 Drawing Sheets

SELECTABLE TOWLINE SPIN CHUTE SYSTEM

ORIGIN OF THE INVENTION

This invention was made jointly by an employee of the U.S. Government and a contract employee in the performance of work under a NASA contract and is subject to the provisions of Public Law 96-517 (35 USC 202) in which the contractor has elected not to retain title.

FIELD OF THE INVENTION

This invention relates generally to spin recovery systems for aircraft and relates specifically to an in-flight selection system for determining the attachment point of an emergency spin recovery parachute to an aircraft.

BACKGROUND OF THE INVENTION

The use of deployable parachutes for emergency recovery of an aircraft in an uncontrollable spin is well known in the art. In some of these known systems a parachute is deployed from the rear of an aircraft fuselage to exert an anti-spin torque opposite to the spin of the aircraft. Since these fuselage mounted parachutes require large diameter parachutes and long towlines to operate effectively, the additional bulk and weight penalties may hinder the performance characteristics of the aircraft. Recently, wing-tip recovery parachutes have been suggested for flying wing type, single, and multi-engine aircraft. In this system, each wing-tip is equipped with a stowed parachute and, when the aircraft enters into an uncontrolled spin, the pilot determines the direction of spin and chooses the appropriate chute to be deployed to correct the spin. Although wing-tip mounted spin recovery parachutes are smaller than the previously used fuselage mounted parachutes, their use requires separate parachutes, separate parachute housings, and separate deployment mechanisms, resulting in very little weight savings. In addition, the positioning of spin recovery parachute housings on each wing-tip results in an inertial disadvantage by having unrepresentative masses located at extreme areas of the aircraft, and an aerodynamic penalty of having unrepresentative structures located in the vicinity of control surfaces. The present invention utilizes the advantageous features of wing-tip mounted spin recovery parachutes while eliminating or minimizing the disadvantages thereof.

SUMMARY OF THE INVENTION

Accordingly, it is an object of the present invention to provide an improved wing-tip spin recovery parachute system for flying wing, single or multi-engine, type aircraft.

Another object of the present invention is to provide a single spin recovery parachute system having selective aircraft attachment points.

An additional object of the present invention is a spin recovery system for a flying wing type aircraft that may also be used as a drag chute for reducing landing speeds.

A further object of the present invention is the provision of multiple towlines having different aircraft attachment points for a single spin recovery parachute and a system for in-flight selection of one or more of these towlines for connection with the parachute prior to deployment thereof.

According to the present invention, the foregoing and additional objects are obtained by providing a centrally mounted parachute housing having a spin recovery parachute with conventional attached shroud lines and a martor release charge disposed therein. A short parachute riser has one end attached to the shroud lines and the other end attached to a ring fitting. Two (or more) shackles are openly disposed adjacent the ring fitting with each shackle connected to one end of a towline. The towline extends along the length of the aircraft wing to a selected attachment point, normally adjacent the wing-tip, where the other end of the towline is secured. Upon command by the pilot, one of the open shackles is locked to the ring fitting and, upon deployment of the parachute, the towline connected to this shackle extends to the selected attachment point for the deployed parachute to assist in aircraft spin recovery.

If desired, or needed for landing, the pilot command signals a shackle connected to a towline at each wing tip to cause the deployed parachute to act as a drag chute to reduce landing speeds.

BRIEF DESCRIPTION OF THE DRAWINGS

A more complete appreciation of the invention and many of the attendant advantages thereof will be more readily apparent as the same becomes better understood with reference to the following detailed description when considered in connection with the accompanying drawings, wherein.

DETAILED DESCRIPTION

Figure 1:
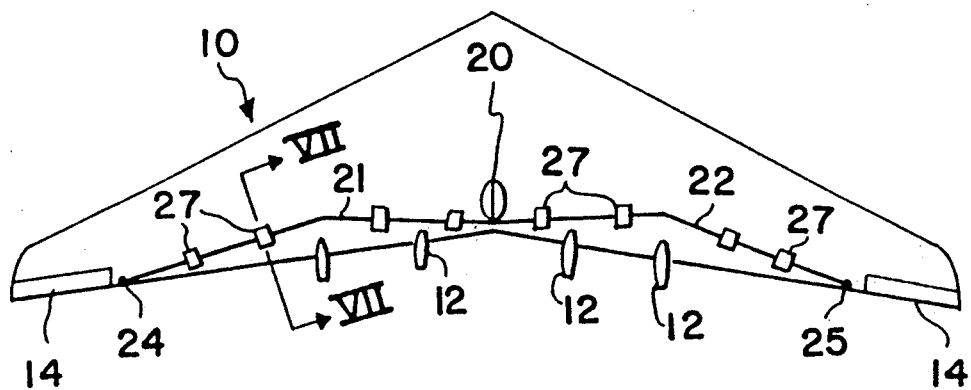
FIG. 1 is a somewhat schematic, top plan view of a multi-engine, flying wing type, aircraft employing the spin recovery system of the present invention.
Figure 2:
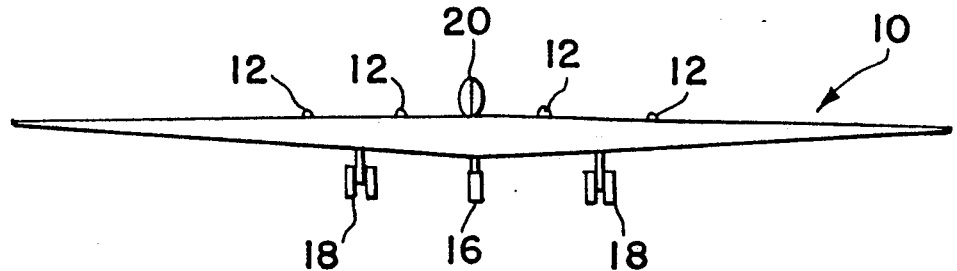
FIG. 2 is a schematic aft elevational view of the aircraft shown in FIG. 1.

Referring now to the drawings, and more particularly to FIGS. 1 and 2, there is shown a thin, flying wing type, multi-engine, aircraft employing the selective spin recovery parachute system of the present invention and generally designated by reference numeral 10. Aircraft 10 includes a plurality of engines 12 disposed along the trailing surface thereof and control flap surfaces 14 adjacent the wing-tips. Additional conventional control surfaces may be employed on the leading and trailing edges of aircraft 10 and are not shown or further described herein in the interest of brevity. As shown more particularly in FIG. 2, a conventional tricycle type landing gear, including a nose wheel 16 and a pair of spaced dual wheels 18 are retractably disposed on the bottom surface area of aircraft 10. A spin recovery parachute housing 20 is secured to the center aft portion of aircraft 10. A pair of parachute towlines 21,22 extend from housing 20 to respective attachment points 24,25 adjacent wing-tip flaps 14, as will be further described hereinafter.

Towlines 21,22 are releasably attached to the aft surface of aircraft 10 by a plurality of spaced transverse straps 27. Straps 27 are provided with a suitable breakaway attachment surface such for example, hook and loop attachment structure sold under the trade name VELCRO, to maintain towlines 21,22 releasably secured to the aircraft surface until sufficient force is exerted on the towlines to cause straps 27 to release or break-away, as will be further explained hereinafter.

Figure 4:
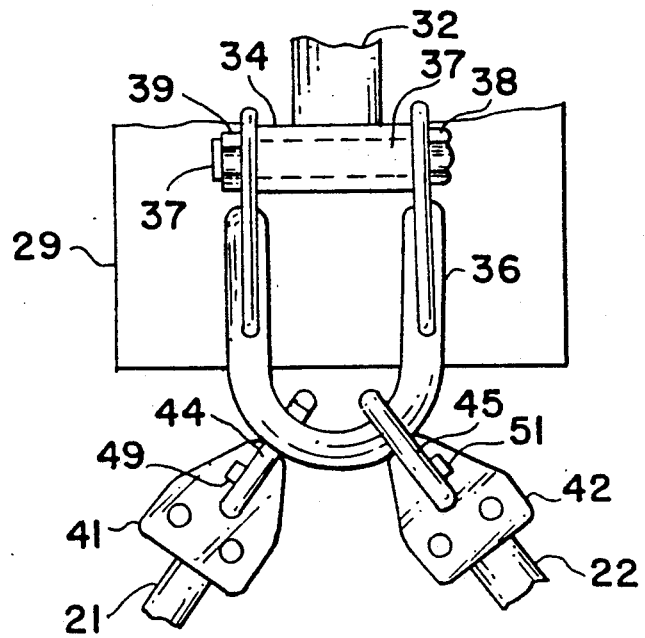
FIG. 4 is a partial view of the shackle connection shown in FIG. 3 with one of the shackles in the closed position for deployment of the spin recovery parachute with the attachment point being located at substantially the right wing-tip of the aircraft shown in FIGS. 1 and 2.
Figure 3:
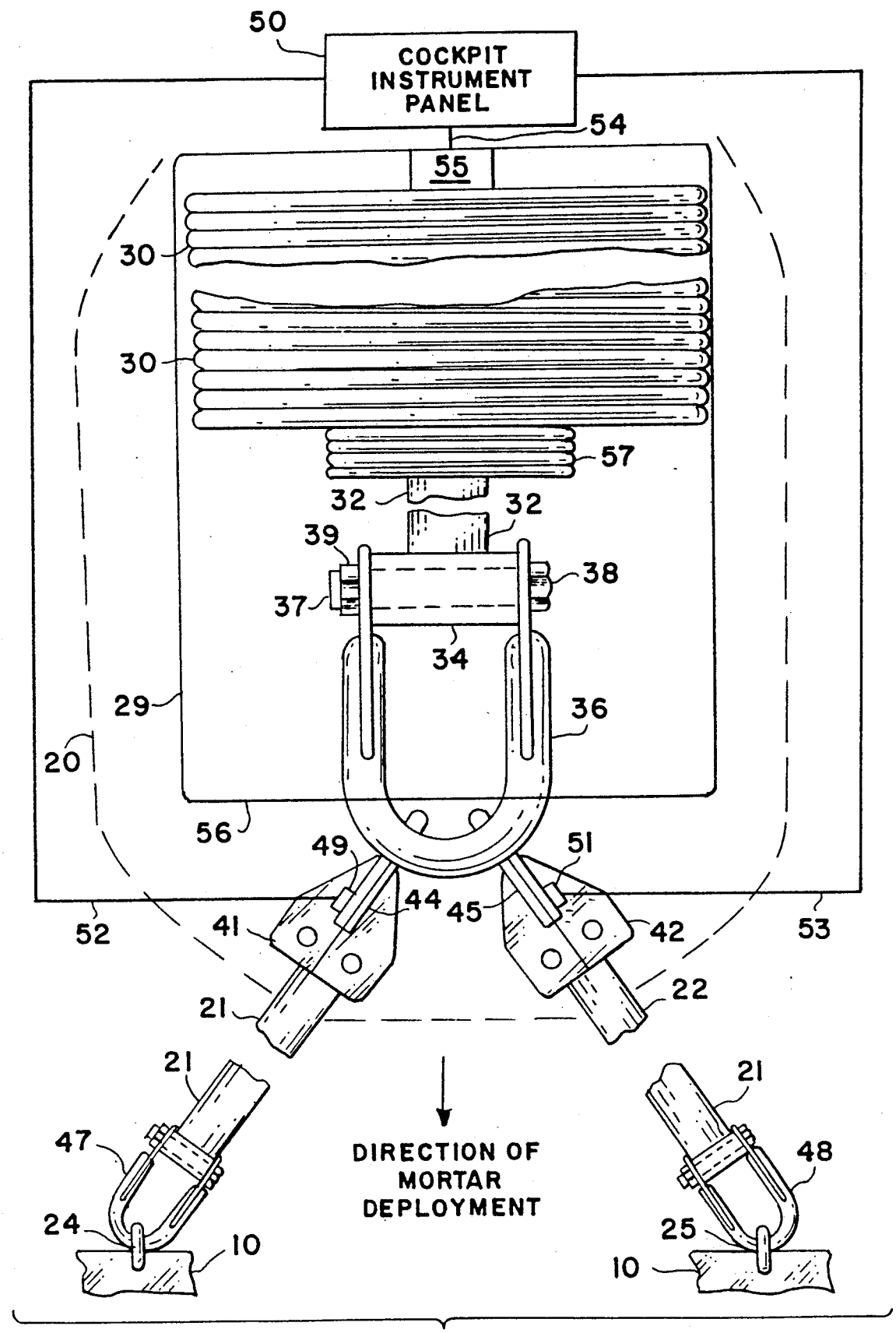
FIG. 3 is an exploded, part schematic, view of the parachute and mechanism for selectively connecting the spin recovery parachute to one of two shackles connected to separate towlines leading to attachment points adjacent a wing-tip of the aircraft.

Referring now more particularly to FIGS. 3 and 4, spin recovery parachute housing 20 includes a parachute canister 29 containing spin recovery parachute 30 therein. Parachute 30 is attached via shroud lines (not visible in this FIG.) to a riser 32 secured to a connector element 34. Both legs of a U-shaped ring fitting, or clevis 36, are attached to connector element 34 via bolt 37 and the curved end of ring fitting 36 extends from canister 29. Bolt 37 extends through the ends of ring fitting 36 and is provided with a conventional hex head 38 and threaded nut 39 on the shank thereof to secure connector element 34 to ring fitting 36.

A pair of shackles 41,42 are disposed adjacent fitting 36 within parachute housing 20. One end of each shackle 41,42 is provided with a pair of open latching jaws, as designated by reference numeral 44 for shackle 41 and reference numeral 45 for shackle 42. Jaws 44 and 45 are positioned relative to ring fitting 36 such that when the jaws are closed, they will latch the respective shackles 41,42 to ring fitting 36. The other end of each shackle 41,42 is integrally attached, respectively, to towlines 21,22 leading to towline attachment points 24,25 on aircraft 10. Towlines 21,22 are provided with respective end connection elements 47,48 similar in construction to ring fitting 36 and not further described herein in the interest of brevity. End connection elements 47,48 connect with suitable ring elements (not designated) fixed to attachment points 24,25.

A command responsive cocking/trip mechanism for selectively opening and closing of jaws 44,45 is disposed on each of shackles 44,45 as designated by respective reference numerals 49,51. Command responsive cocking/trip mechanisms 49,51 are connected via lead wires 52,53 leading to the cockpit instrument panel, as schematically shown and designated by reference numeral 50. The opening or closing of jaws 44,45 may thus be controlled by the aircraft pilot. Any suitable and conventional mechanical, electrical, pneumatic or hydraulic mechanism may be employed for control of the opening/closing of jaws 44,45. Also, conventional indicator lights on cockpit instrument panel 50 give instant and visual indication to the pilot of the open or closed status of jaws 44,45.

Once the aircraft enters into an uncontrolled spin, the pilots selects the attachment point desired for the deployed parachute, depending upon the direction of the spin, and command signals the closing of either jaws 44 or 45. In FIG. 4, the signal has been given to close jaws 45 on shackle 42 and jaws 44 on shackle 41 remain open. The pilot then actuates and explosive mortar charge 55 disposed at the opposite end of parachute canister 29 to force open canister closure 56 and release drogue chute 57 therefrom. Mortar charge 55 is connected to and controlled from cockpit instrument panel 50 through lead wire 54, in a conventional manner. Drogue chute 57 is attached to the canopy of main parachute 30 and, upon inflating, pulls parachute 30 from the canister for inflation thereof.

Figure 5A:
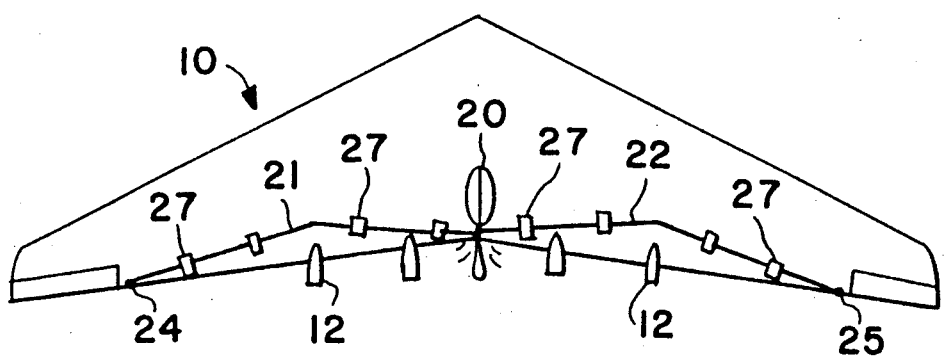
FIGS. 5a-5c show the sequence of deployment of the right, towline attached, spin recovery parachute of the present invention.
Figure 5B:
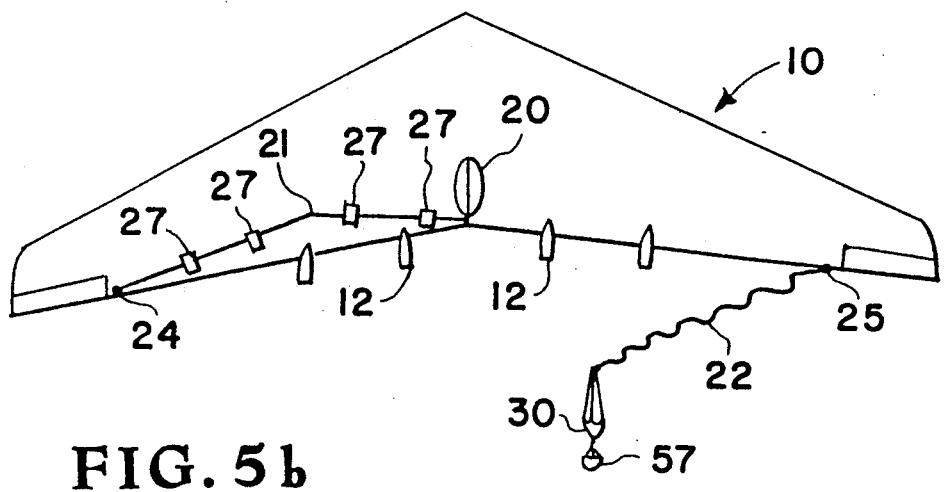
Figure 5C:
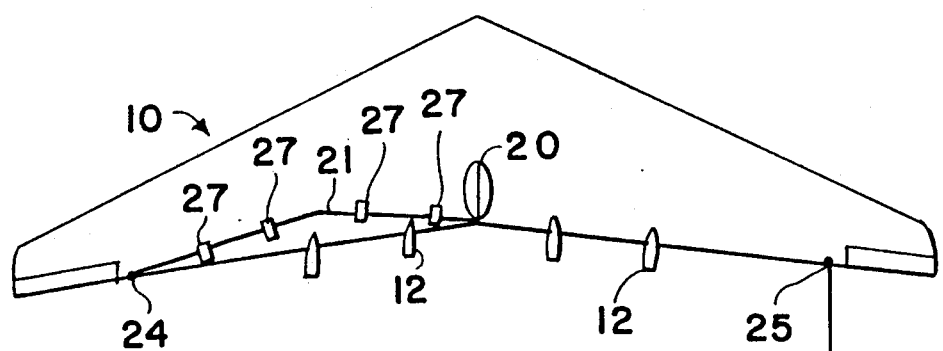

Canister closure 56 is formed of a petal-like arrangement and, when blown open by the force of mortar charge 55, permits the compressed parachutes 57 and 30 to expand and subject drogue chute 57 to the airstream, as illustrated in FIG. 5a. Once drogue chute 57 is exposed to the airstream, it expands and pulls parachute 30 from canister 29 in the direction as indicated by the arrow in FIG. 3. The force or pull on towline 22 by the expanding parachute 30 is sufficient to overcome the break-away retention straps 27 and towline 22 is released from the wing surface and extended, as illustrated in FIGS. 5b and 5c. Ring fitting 36 and shackles 41,42 are in a different plane from that of outside housing 20 and are held in place on the surface of aircraft 10 by suitable break-away straps (not illustrated).

Once towline 22 is extended to the position illustrated in FIG. 5c, the spin recovery parachute 30 is effective to reduce spin on the aircraft and permit the pilot to regain control. When the pilot regains control, towline 22 is separated from aircraft 10 in a conventional manner to jettison parachute 30 and the aircraft resumes normal flight.

Figure 6:
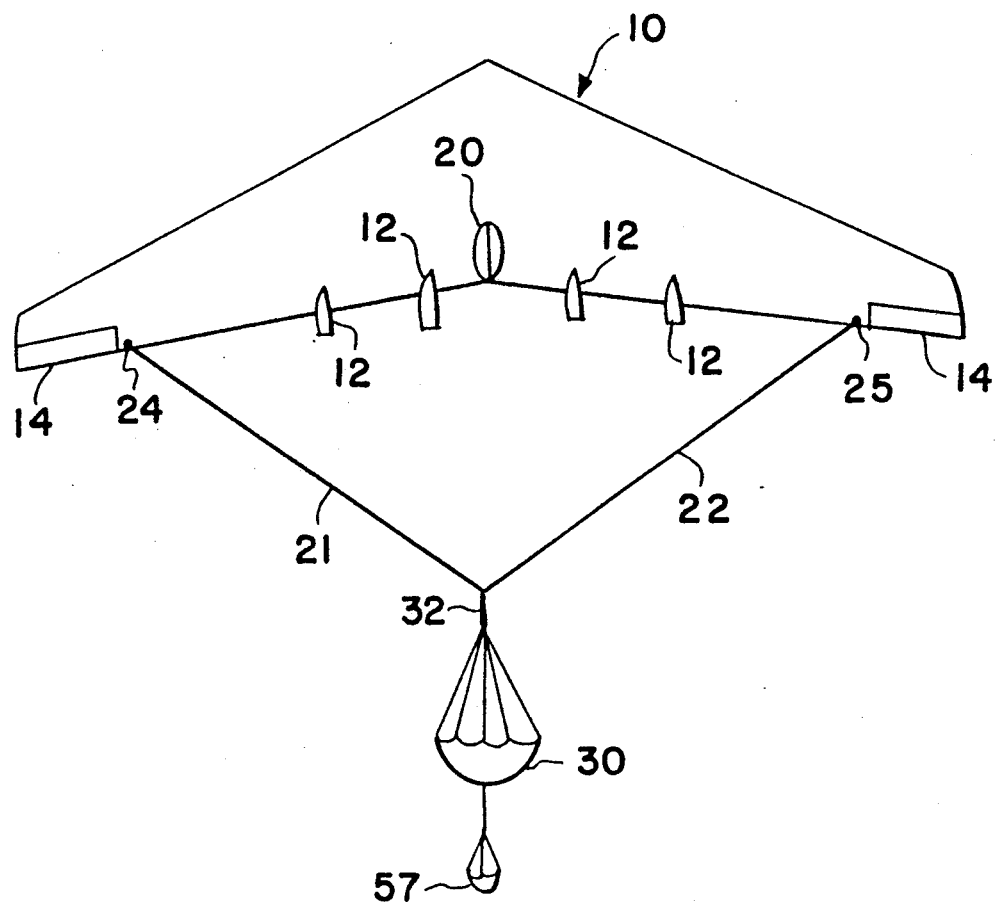
FIG. 6 is a schematic top plan view of the aircraft shown in FIGS. 1-2 wherein both shackles (shown in FIG. 3) are connected to the parachute deployment mechanism to assist in reducing aircraft landing speeds.

Referring now more particularly to FIG. 6, the aircraft 10 is shown when parachute 30 is employed as a drag chute to reduce aircraft landing speeds. In this situation, both shackles 41,42 (FIG. 3) are attached via respective jaws 44,45 to ring fitting 36. Thus, when mortar charge 55 is actuated and parachute 30 pulled from canister 29, both towlines 21,22 are attached thereto and released via break-away straps 27 from aircraft 10. Parachute 30 is then secured to both attachment points 24,25 and exerts a drag on the entire aircraft to thereby reduce the aircraft landing speed.

Figure 7:
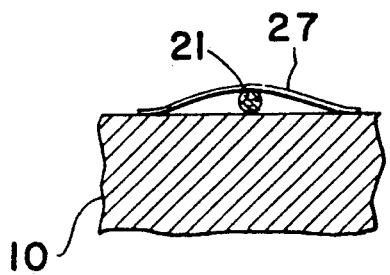
FIg. 7 is a schematic sectional view taken along line VII—VII of FIG. 1.

Referring now to FIG. 7, a part sectional view of one of the break-away straps 27 releasably retaining towlines 21,22 onto the wing surface of aircraft 10 is shown. As shown therein, the ends of strap 27 are provided with hook and loop fastening structure, or other releasable attachment structure to retain towlines 21,22 in position until sufficient force is exerted on the towline to release the break-away straps.

Figure 8:
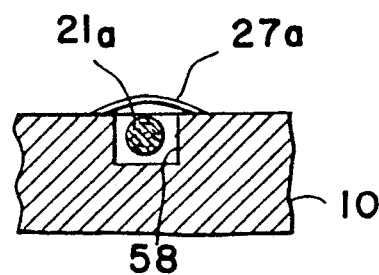
FIG. 8 is a view similar to FIG. 7 and illustrating an alternate towline placement and towline attachment mechanism.

An alternate break-away strap retention for towlines 21,22 is shown in FIG. 8. In this embodiment, a groove 58 is provided in the top aft surface of the aircraft wing and is of adequate size to accomodate one of towlines 21,22 therein. Groove 58 extends in both directions from parachute housing 20 to the attachments points 24,25 and follows essentially the same contour on each side of aircraft 10 as the locations of towlines 21,22 shown in FIG. 1. An elongated break-away strap 27a is then positioned over the entire length of groove 58 on each side of parachute housing 20 to releasably retain towlines 21,22 in position until the force of parachute 30 thereon releases the straps. Straps 27a are also provided with a hook and loop attachment, adhesive or similar releasable structure.

Although the invention has been described relative to specific embodiments thereof, it is not so limited and there are numerous modifications and variations thereof that will be readily apparent to those skilled in the art. For example, one continuous break-away retention strap 27a may be employed along the entire length of towline 21,22 in lieu of the multiple transverse straps on the aircraft surface shown in FIG. 1, if so desired. Also, multiple transverse straps may be employed in lieu of the single strap shown over groove 58 in the embodiment of FIG. 8, is so desired. These and other modifications and variations of the invention described will be readily apparent to those skilled in the art in the light of the above teachings.

It is therefore to be understood that, within the scope of the appended claims, the invention may be practiced other than as specifically described herein.

What is claimed as new and desired to be secured by Letters Patent of the United States is:

1. A spin recovery system for an aircraft comprising, in combination:
   an aircraft having an aft surface and including a wing;
   a parachute housing secured at substantially the longitudinal center of said aft surface;
   a deployable parachute carrier by said parachute housing;
   said parachute, when deployed, having one end of a tow line connected thereto and having the other end of the tow line connected to an attachment point on said aircraft;
   means for in-flight selection of the location of said attachment point on said aircraft to a point adjacent a tip of said aircraft wing; and
   means for deploying said parachute from said housing on command.

2. The spin recovery system of claim 1 including a pair of towlines for said deployable parachute, each of said pair of towlines having a first end thereof attached to an attachment point on said aircraft aft surface;
   said attachment points for said pair of towlines being located, one each, adjacent the wing-tips of said aircraft wing;
   a second end of each said towline being attached to a shackle having a pair of connection jaws selectively movable between an open and closed position;
   a ring fitting attached to said deployable parachute;
   said connection jaws, when closed, securing said towline to said ring fitting and, when open, removing the connection between said towline and said parachute; and
   jaw actuating means disposed on each side shackle and connected to the cockpit instrument panel of said aircraft to permit in-flight operation by the aircraft pilot to selectively control the opening and closing of said connection jaws to connect one or both of said towlines to said parachute prior to deployment thereof.

3. A spin recovery system for an aircraft comprising in combination:
   an aircraft having a wing and an aft surface;
   a selectively deployable parachute for applying a force to said aircraft aft surface;
   means for stowing said parachute at substantially the horizontal center of said aircraft aft surface;
   at least two towlines for said parachute with each of said towlines having an end attached at an attachment point adjacent opposite wing-tip areas on said aircraft;
   in-flight operable means for selectively connecting at least one of said at least two towlines to said parachute; and
   means for deploying said parachute on command.

4. The spin recovery system of claim 3 wherein said means for stowing said parachute at substantially the horizontal center of said aircraft includes:
   a canister housing said parachute,
   a releasable cover for said canister to retain said parachute in compact stowage therein, and
   and explosive mortar charge for releasing said releasable cover to deploy said parachute.

5. The spin recovery system of claim 3 wherein said in-flight operable means for selectively connecting at least one of said at least two towlines to said parachute includes:
   a ring fitting attached to said parachute, a shackle attached at one end to an end of each of said at least two towlines;
   a pair of latching jaws extending from an end of each shackle opposite to said one end thereof attached to an end of each of said at least two towlines;
   actuating means connected to each of said shackles for selectively opening and closing each said pair of latching jaws;
   each said pair of latching jaws being positioned relative to said ring fitting such that when said latching jaws are closed said latching jaws will latch said shackle and its attached towline to said parachute through said ring fitting and when open, said shackle and its attached towline remain unconnected to said parachute.

6. The spin recovery system of claim 5 wherein said actuating means connected to each of said shackles for selectively opening and closing each said pair of latching jaws is positioned on each said shackle and connected via a lead wire to the cockpit instrument panel of said aircraft.

7. The combination of an aircraft having a wing and an emergency spin recovery system for said aircraft, comprising:
   a spin recovery package mounted at the substantial center of the aft end of said aircraft;
   said spin recovery package including a deployable parachute;
   means for in-flight selection of a towline attaching said parachute to a selected attachment point adjacent a wing-tip of said aircraft wing; and
   said parachute being deployable from said spin recovery package on command.

8. The combination of claim 7 wherein said means for in-flight selection of a towline attaching said parachute to a selected attachment point adjacent a wing-tip of said aircraft wing includes:
   a pair of parachute towlines disposed on said aircraft;
   each of said pair of parachute towlines having a first end thereof attached to an aircraft attachment point adjacent opposite wingtips of said aircraft wing;
   each of said pair of parachute towlines having a second end attached to individual shackles disposed within said spin recovery package;
   each said shackle having a pair of jaw closure elements thereon and selectively movable from an open and a closed position;
   a ring fitting attached to said parachute and positioned relative to said shackles such that when said pair of jaw closure elements on a shackle are in the closed position, said shackle and its attached towline will be secured to said parachute and when said pair of jaw closure elements on a shackle are in the open position, said shackle and its attached towline will not be secured to said parachute; and jaw closure actuation means secured to each said shackle and connected to the cockpit instrument panel of said aircraft to permit pilot selection and control of the opening and closing of said jaw closure elements and thereby permit in-flight selection of the parachute towline attachment point on said aircraft.

9. The combination claim 8 including means for securing said pair of parachute towlines disposed on said aircraft to the aircraft wing surface from the attachment points adjacent opposite wing-tips of said aircraft wing to said spin recovery package mounted at the substantially horizontal center portion of said aircraft.

10. The combination of claim 9 wherein said means for securing said pair of parachute towlines to the aircraft wing surface includes a plurality of spaced straps transversely positioned across the lengths of said towlines and attached to said aircraft wing surface via a hook and loop fastener structure.

11. The combination of claim 8 including an elongated groove formed in the aircraft wing surface and extending from each of said attachment points for said pair of parachute towlines to said spin recovery package and means for releasably securing each of said pair of parachute towlines within a length of said elongated groove.

12. The combination of claim 11 wherein said means for securing said pair of parachute towlines within a length of said elongated groove includes a break-away retention strap extending the length of and disposed over each said groove, said break-away retention strap being secured to the aircraft wing via a hook and loop fastener structure.

13. A method of effecting spin recovery of an aircraft that enters an uncontrollable spin, comprising the steps of:

providing a spin recovery parachute housed essentially at the horizontal center aft portion of an aircraft;

providing a pair of towlines for the spin recovery parachute attached, respectively, at a point adjacent opposite aft wing-tip surfaces of the aircraft;

securing the pair of towlines to the aircraft wing surface from the point of attachment to the housed parachute with releasable break-away retention straps;

providing selective attachment mechanisms for each towline adjacent the housed parachute;

providing in-flight selection mechanism operable by the aircraft pilot to permit selection of one of the towlines to be attached to the parachute depending upon the direction of the aircraft spin; wherein when the aircraft enters into an uncontrolled spin the pilot determines the direction of spin and connects the towline attached to the aircraft wing-tip opposite to the direction of the spin and deploys the parachute, the deployed parachute exerts adequate pressure on the releasable break-away retention straps to effect release of the hook and loop connection thereof and permits the towline attached to the parachute to extend to the attachment point and exert sufficient drag on the aircraft to permit the pilot to regain control thereof.

14. The method of claim 13 including the step of providing a groove along the aft surface of the aircraft wing and extending from the towline point of attachment on each wing-tip to the spin recovery parachute housing at the substantially horizontal center of the aircraft; and wherein the break-away straps are in the form of one continuous strap on each side of the spin recovery parachute housing and extending linearly over the groove containing towline from each side of the spin recovery parachute housing to the attachment point for each towline adjacent the wing-tip.

* * * * *